US008539221B2

(12) United States Patent
Tremblay et al.

(10) Patent No.: US 8,539,221 B2
(45) Date of Patent: Sep. 17, 2013

(54) METHOD AND SYSTEM FOR IDENTIFYING AN APPLICATION TYPE OF ENCRYPTED TRAFFIC

(75) Inventors: Marc Tremblay, Montreal (CA); Sousso Kelouwani, Laval (CA); Eric Melin, Montreal (CA)

(73) Assignee: Guavus, Inc., San Mateo, CA (US)

( * ) Notice: Subject to any disclaimer, the term of this patent is extended or adjusted under 35 U.S.C. 154(b) by 224 days.

(21) Appl. No.: 12/726,849

(22) Filed: Mar. 18, 2010

(65) Prior Publication Data

US 2010/0250918 A1    Sep. 30, 2010

Related U.S. Application Data

(60) Provisional application No. 61/164,057, filed on Mar. 27, 2009.

(51) Int. Cl.
*H04L 29/06* (2006.01)
(52) U.S. Cl.
USPC ............................... 713/150; 706/12; 706/46
(58) Field of Classification Search
USPC ..................................... 713/150; 706/12, 46
See application file for complete search history.

(56) References Cited

U.S. PATENT DOCUMENTS

| 5,086,469 | A  | * | 2/1992  | Gupta et al.  | 713/160 |
| 7,447,768 | B2 | * | 11/2008 | Kelly et al.  | 709/224 |
| 7,778,194 | B1 | * | 8/2010  | Yung          | 370/252 |
| 2005/0177746 | A1 | * | 8/2005  | Bunn et al.   | 713/201 |
| 2007/0192863 | A1 | * | 8/2007  | Kapoor et al. | 726/23  |
| 2009/0150972 | A1 | * | 6/2009  | Moon et al.   | 726/1   |

OTHER PUBLICATIONS

Perrone et al, K-Means Clustering for Hidden Markov Model, Sep. 2000, International Unipen Foundation: pp. 229-238.*
Wright et al., On Inferring Application Protocol Behaviors in Encrypted Traffic, Dec. 2006: Jornal of Machine Learning Research.*

* cited by examiner

*Primary Examiner* — Amare F Tabor
(74) *Attorney, Agent, or Firm* — Bingham McCutchen LLP (57) ABSTRACT

The present relates to a method and a system for identifying an application type from encrypted traffic transported over an IP network. The method and system extract at least a portion of IP flow parameters from the encrypted traffic using at least one of specific target encryption types. Then, the method and system transmit the extracted IP flow parameters to a learning-based classification engine. The learning-based classification engine has been trained with unencrypted traffic. Then, the method and system infer at least one corresponding application type for the extracted IP flow parameters.

17 Claims, 5 Drawing Sheets

METHOD AND SYSTEM FOR IDENTIFYING AN APPLICATION TYPE OF ENCRYPTED TRAFFIC

FIELD

The present is related to encrypted traffic, and more particularly to a method and system for identifying an application type from encrypted traffic.

DETAILED DESCRIPTION

Classification of IP traffic circulating on an IP data network usually relies on a technology known as Deep Packet Inspection (DPI). It first consists in capturing the IP traffic with a probe, positioned in a location of the IP data network where the IP traffic is aggregated. Then, the IP traffic is classified and analysed using the different protocol layers of the OSI (Open System Interconnections) model, to extract meaningful information. Different types of classification are performed using DPI. Identifying the type of application in use by analysing the underlying protocol layers is one of them.

However, a significant and increasing part of the traffic circulating on IP data networks is encrypted. Several encryption technologies are available, such as TLS (Transport Layer Security) and its predecessor SSL (Secure Sockets Layer), or IPSec (Internet Protocol Security). One of the main characteristics of the encryption technologies is the protocol layer on which it is applied. It may include the application layer, the transport layer (e.g. TLS and SSL) and/or the network layer (e.g. IPSec). In almost every case, once encryption is used, it is no longer possible to classify the IP traffic using DPI technologies.

Encrypted traffic flows are used to transport various types of applications, including for example web browsing, instant messaging, file download, streaming, etc. Various stakeholders, including network Operators, have an increasing need to identify the type of applications used on their IP based data networks for operational and marketing purposes. Thus, the difficulty to identify the applications associated to encrypted traffic flows is a serious issue to be overcome.

In certain cases, contextual information extracted from unencrypted traffic via DPI technology can be used to identify an associated encrypted traffic flow. For instance, some peer-to-peer applications use unencrypted communications to setup a data transfer and encrypted communications to execute the data transfer. In this case, the unencrypted communication contains information allowing the identification of the encrypted traffic flow as a component of the peer-to-peer application. However, in the general case, it is not possible to identify an encrypted traffic flow using a DPI technology.

Alternative solutions have been developed to identify the type of application used in encrypted traffic. One family of solutions uses a learning-based classification engine implementing artificial intelligence technology. The principle of these learning-based solutions is to use a training set to teach the learning-based classification engine, before effectively being able to perform application type recognition on the encrypted traffic. The usual way to proceed for the learning phase is to generate unencrypted IP traffic, encrypt it, and feed it to the learning-based classification engine along with the expected result (which application type is associated with the encrypted traffic). The learning-based classification engine learns to associate the encrypted traffic used for the training and the corresponding application types.

One issue with this type of solution is the lack of flexibility and automation. The encrypted traffic used for the training is generated manually in most cases, even if some level of automation may be achieved. In any case, the steps of selecting the original unencrypted traffic, encrypting it, associating the related application type, and presenting it to the learning-based classification engine involves a lot of tedious human interactions.

Another issue with this type of solution is its potential lack of accuracy. During the training period, the learning-based classification engine does not operate on encrypted traffic generated by communication devices in an operational environment, but on artificially generated encrypted traffic. Thus, the result of the learning process may not be appropriate for a deployment in a production environment, like an IP network of a Mobile Operator or a fixed broadband ISP. It is particularly true if real time characteristics of the traffic are used for the training process.

Therefore, there is a need of overcoming the above discussed issues with respect to flexibility and accuracy of existing solutions using a learning-based classification engine. An object of the present is therefore to provide a method and system for identifying an application type of encrypted traffic.

Generally stated, a non-restrictive illustrative embodiment of the present is a method and system for identifying an application type of encrypted traffic transported over an IP network. The method and system comprise: training a learning-based classification engine using unencrypted traffic to establish a mapping between IP flow parameters and application types, extracting at least a portion of IP flow parameters from encrypted traffic, transmitting the at least a portion of said IP flow parameters extracted from encrypted traffic to the learning-based classification engine and inferring by the learning-based classification engine at least one corresponding application type for the extracted IP flow parameters. The IP flow parameters have corresponding values in both the unencrypted traffic and the encrypted traffic, and inferring by the learning-based classification engine is performed by comparing the extracted IP flow parameters with the corresponding values for unencrypted traffic.

The method and system apply to any kind of IP data traffic, for instance traffic mobile IP data traffic, fixed IP data traffic and enterprise IP data traffic.

Several IP flow parameters, including (but not limited to) packet size, latency, jitter, number of packets, are used for a training phase. These parameters have the property to be available in unencrypted and encrypted traffic.

The present method and system rely on almost fully automated learning process. Only the supervision and calibration of the learning-based classification engine require intervention from a specialist. The sample unencrypted traffic used for training the learning-based classification engine goes through a DPI-based classification engine to identify the type of application associated to each IP flow, and the result is transmitted to the learning-based classification engine. The sample unencrypted traffic also goes through a pre-processing unit integrated into the DPI-based classification engine. The aforementioned parameters are extracted from the IP flows by the pre-processing unit and fed to the learning-based classification engine. The learning process of the learning-based classification engine establishes a mapping between the parameters and the type of application.

Also, the present method and system includes a qualification and fine tuning process of the learning-based classification engine. When the training process is completed, a sample of encrypted traffic for each application type to be identified is used for this qualification and fine tuning process.

The unencrypted traffic used for the training of the learning-based classification engine is generated in a target production environment, such as a Mobile Operator data network. A portion of the live traffic is sampled in real time and used for the training of the learning-based classification engine. Alternatively, a capture of a sample of the live traffic is used for the training of the learning-based classification engine in a controlled environment. Regarding the encrypted traffic used to qualify the learning-based classification process, ideally it should be generated in the target production environment. Otherwise, it shall be generated in a controlled environment as close as possible to the real conditions of the target production environment.

Figure 1:
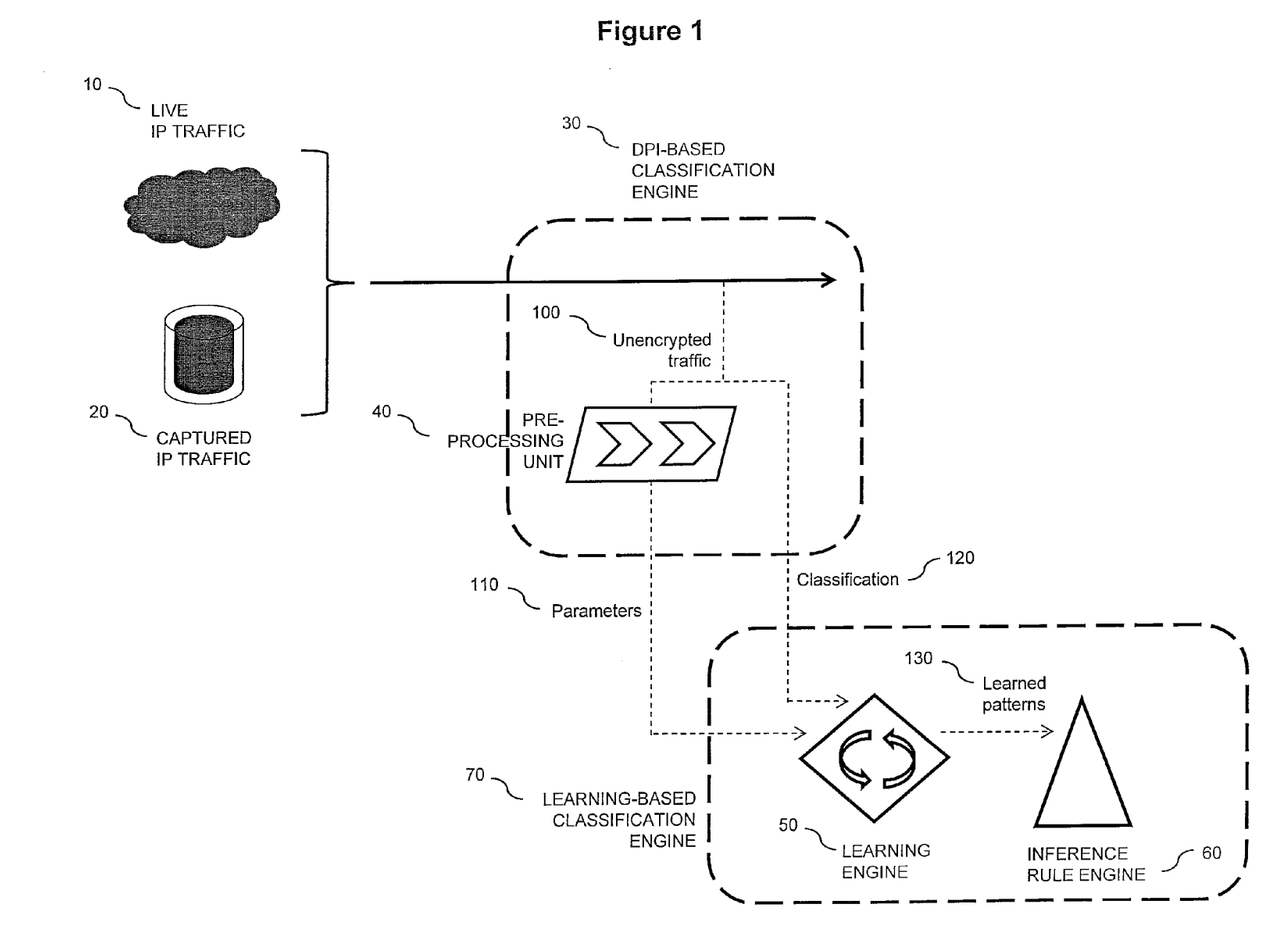
FIG. 1 is a schematic representation of a training phase of a system for identifying an application type of encrypted traffic, according to a non-restrictive illustrative embodiment.
Figure 2:
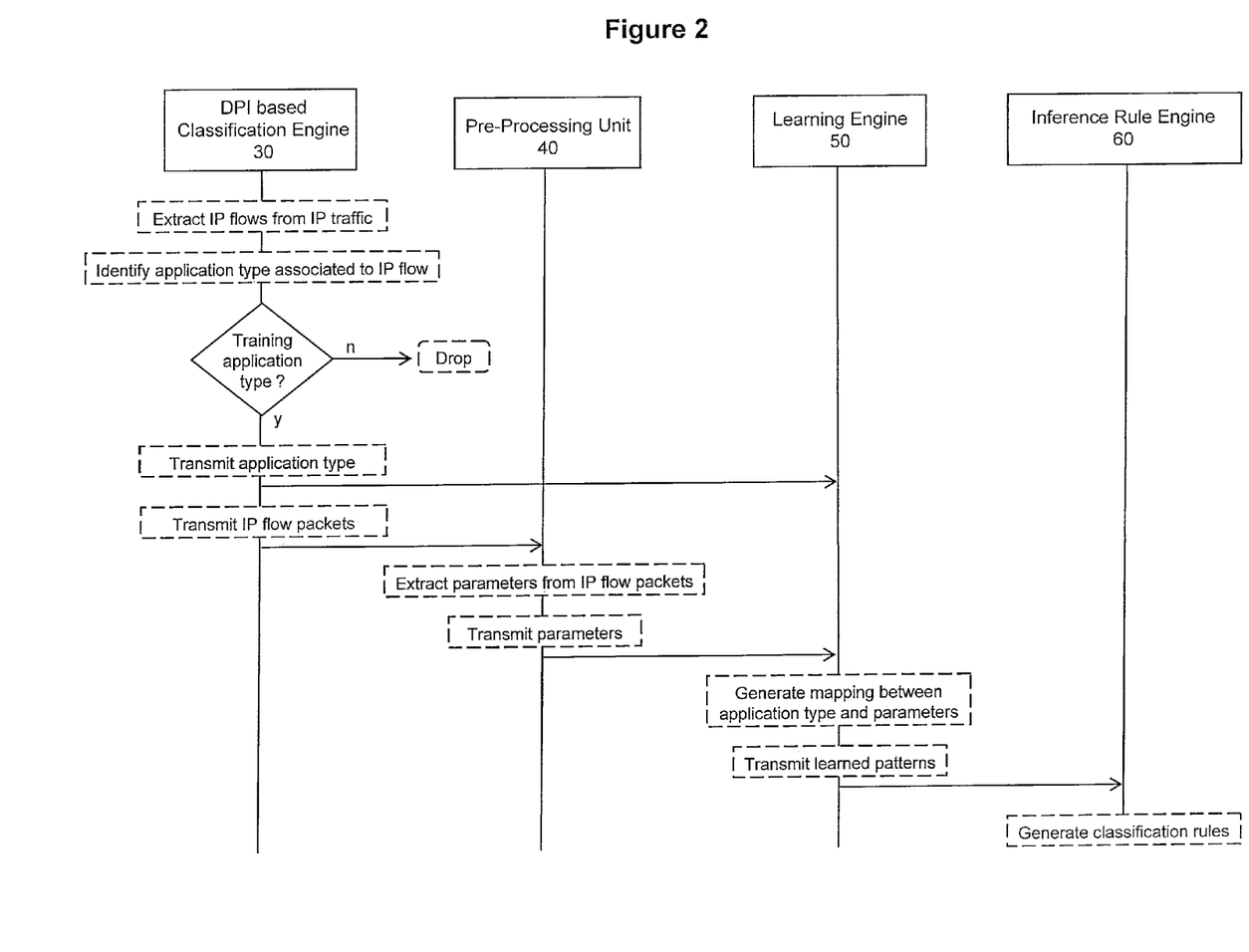
FIG. 2 is a flow chart diagram of the training phase for identifying an application type of encrypted traffic, according to a non-restrictive illustrative embodiment of a method.

Referring now concurrently to FIGS. 1 and 2, the training phase of the learning-based classification engine will be described.

A learning-based classification engine 70 is schematically represented in FIG. 1. The learning-based classification engine 70 comprises a learning engine 50 and an inference rule engine 60. The learning engine 50 is used during the training phase. The training phase consists in training the learning engine 50 with unencrypted traffic 100. In a first option, the learning-based classification engine 70 is placed directly in a production environment, such as an IP data network of a Mobile Operator. In such a case, live IP traffic 10 is used to train the learning engine 50. A copy of the live IP traffic is extracted from the network and directed to a DPI-based classification engine 30. The unencrypted traffic 100 used for the training is part of the live IP traffic 10 and is processed by the DPI-based classification engine 30.

The DPI-based classification engine 30 is well known in the art and relies on Deep Packet Inspection (DPI) technology. DPI technology consists in analyzing the IP packets according to protocol layers 2 to 7 of the OSI model, to extract relevant information. A traditional DPI-based classification engine may be used for different purposes. In particular, the DPI-based classification engine 30 typically has the capability to identify the type of application associated to a specific IP flow when it is not encrypted. The DPI-based classification engine 30 has a specialized module used for the training of the learning engine 50: the pre-processing unit 40.

During training of the learning-based classification engine 70, the first operation performed by the DPI-based classification engine 30 consists of extracting IP flows from the unencrypted traffic 100. For a given IP flow that is not encrypted, the DPI-based classification engine 30 identifies the associated application type. If the application type corresponds to a pre-defined set of application types targeted by the learning process, all the IP packets belonging to the IP flow related thereto are transmitted to the pre-processing unit 40, to generate training parameters 110. Additionally, a classification 120 corresponding to the application type is transmitted to the learning engine 50.

The next operation, performed by the pre-processing unit 40, consists in computing a pre-defined set of parameters 110. The computation is performed on the aforementioned IP packets transmitted from the DPI based classification engine 30. A complete set of parameters 110 is calculated for each IP flow related to a specific applicative session. The parameters 110 are then transmitted to the learning engine 50. The set of parameters 110 is selected so as to characterize the different types of applications to identify. The pre-processing unit 40 has the capability to identify and follow the IP traffic flow corresponding to a specific applicative session, to differentiate its uplink and downlink flows, and to calculate the set of parameters 110 representative of the application type.

For clarification purposes, the transmission to the learning engine 50 of the set of parameters 110 and the classification 120 (application type) are represented separately on FIG. 1. However, from an implementation point of view, the set of parameters 110 and the classification 120 are transmitted at the same time. In this way, the learning engine 50 has all the required information (application type and associated parameters) to perform the training process for each extracted IP data flow.

The set of parameters 110 may be grouped into categories. Each category of parameters 110 is computed for the uplink, for the downlink, and for both the uplink and the downlink. Among the categories of parameters 110, the length of the IP packets corresponding to an applicative session is an example to be considered. Other categories of parameters such as minimum packet length, maximum packet length, average packet length and standard deviation may also be calculated. As previously mentioned, these parameters are calculated on the uplink packets only, on the downlink packets only, and on both the uplink and downlink packets. Having values for the uplink packets only and the downlink packets only is necessary for asymmetric applications (applications with different behaviors for the uplink and downlink flows). For example, in the case of web browsing, the uplink packets are small (requests for web pages), while the downlink packets are bigger (transfer of the content of the web pages).

Another example of parameters 110 to consider is the inter-arrival time, also called latency, of the IP packets corresponding to an applicative session. The minimum latency, the maximum latency, the average latency and the standard deviation (also called the jitter) are calculated. These values are calculated for the uplink packets: an uplink latency sample is the delay between two consecutive uplink packets. These values are also calculated for the downlink packets: a downlink latency sample is the delay between two consecutive downlink packets. These values may also be calculated for round trip packets: a round trip latency sample is the delay between an uplink packet and the following downlink packet.

Another example of parameters 110 to consider is the number of IP packets corresponding to an applicative session. This value is calculated on the uplink packets only, on the downlink packets only, and on both the uplink and downlink packets.

Three parameters have been mentioned for the training of the learning engine 50. However, any pertinent parameter may be added to the process described previously. One constraint is that the parameter is extractable from encrypted traffic. The other constraint is that the parameter has corresponding values for both encrypted and unencrypted traffic (or at least the variations are predictable). For example, the initial advertized TCP window size may be used as an additional parameter for TCP traffic. This parameter is available for encrypted traffic where the TCP header is in clear, like TLS and SSL.

So far, the notion of IP flow has been used in generic terms, as a way to represent the IP traffic associated to a specific application session. A concrete implementation of the notion of IP flow is usually a tuple, including a source IP address, a destination IP address, a transport protocol (TCP or UDP), a source port and a destination port.

The application types to be identified are categories of applications with similar properties regarding the parameters 110. Examples of such application types include (but are not limited to): bulk applications like FTP (File Transfer Protocol), interactive applications like SSH (Secure Shell) and Telnet, web applications based on the HTTP (Hypertext Transfer Protocol) protocol, peer-to-peer applications, mail applications, multimedia applications like audio and video streaming.

The last operation, performed by the learning engine 50, consists in the generation of a mapping between the classification 120 and the parameters 110. For this purpose, the learning engine 50 relies on artificial intelligence technology, to execute a learning process. Artificial neural networks, Hidden Markov Model, clustering algorithms (e.g. K-Nearest Neighbor or K-Mean) are examples of such artificial intelligence technologies. All these artificial intelligence technologies rely on the same principle: for each target application type (the classification 120), feed the learning engine 50 with a set of parameters samples 110. The mentioned artificial intelligence technologies have the property to generate and memorize a model of the parameters, referred to as the learned patterns 130. Based on the learned patterns 130 of the learning engine 50, an inference rule engine 60 generates classification rules. These rules are used for the encrypted IP flows categorization. Thus, given a new set of parameters representing an encrypted IP flow, the inference rule engine 60 determines the associated application type with a good level of probability (typically 80 to 100%). The process of using the inference rule engine 60 with encrypted traffic is detailed in FIGS. 3 and 4.

One of the mentioned artificial intelligence technologies is the artificial neural network, i.e. a computational model based on an interconnected group of artificial neurons. It is an adaptive system that changes its structure based on external information that flows through the network during the learning phase. In other words, it is a non-linear statistical data modeling tool, used to model complex relationships between inputs and outputs or to find patterns in data.

Another mentioned artificial intelligence technology is the Hidden Markov Model. One assumption when dealing with pattern recognition is the Markov property of the underlying stochastic process. Each component of the parameters 110 can be modeled as a stochastic process, since there is a great part of randomness affecting the prediction of its occurrence. The Markov property means that, given the present state of the system, future states are independent of the past states. Future states will be reached through a probabilistic process instead of a deterministic one. At each step, the system may change its state from the current state to another state, or remain in the same state, according to a certain probability distribution.

All the previously mentioned methods require the full knowledge of the mapping between the parameters and the type of application. However, if the mapping is not available prior to the training phase of the learning engine 50, clustering methods can be used to discover this mapping. Among well-known clustering methods, K-Nearest Neighbor and K-Mean may be considered. For example, the K-Nearest Neighbor algorithm (k-NN) is a method for classifying objects based on closest training examples in the feature space.

In an alternative option, the learning-based classification engine 70 is placed in a controlled environment for the learning phase. A controlled environment means that live IP traffic 10 is not used for the training. Instead, captured IP traffic 20 is used. It consists in a sample of the live IP traffic 10 captured in the production environment, like the Mobile Operator data network. The learning process in the controlled environment is similar to the one in the production environment and involves the same entities: the DPI-based classification engine 30 with the pre-processing unit 40, and the learning engine 50. The benefit of performing the learning process in a controlled environment is that it has a minor impact on the operations of the target production environment. Usually, network operators are very cautious to introduce new equipments in their operational network and to have them perform tasks not directly related to the usual operations of the network.

Figure 3:
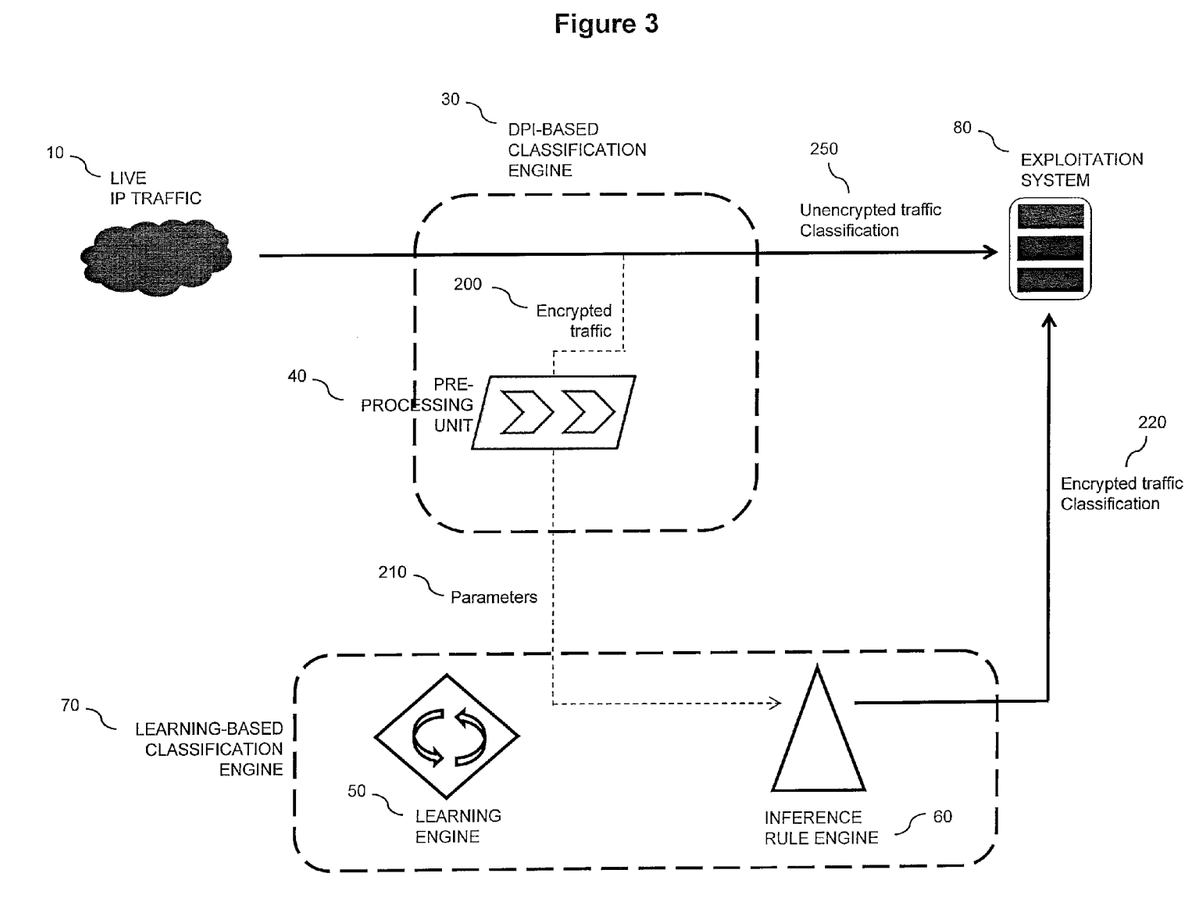
FIG. 3 is a schematic representation of an operational phase of the system for identifying an application type of encrypted traffic, according to a non-restrictive illustrative embodiment.
Figure 4:
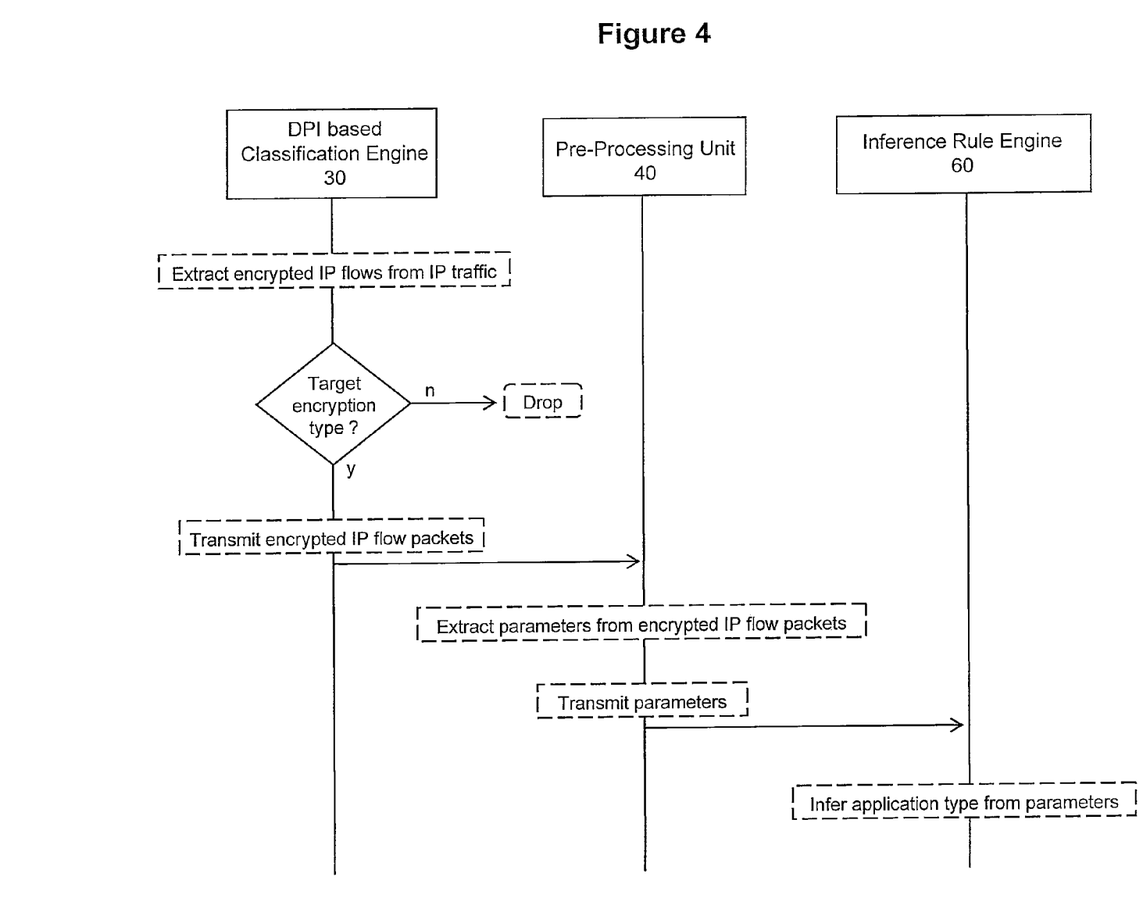
FIG. 4 is a flow chart diagram of the operational phase for identifying an application type of encrypted traffic, according to a non-restrictive illustrative embodiment of the method.

Referring now concurrently to FIGS. 3 and 4, the operational phase of a method and system for identifying an application type of encrypted traffic will be described.

The learning-based classification engine 70 considered in FIG. 3 has been trained according to the process described in FIGS. 1 and 2. Thus, the learned patterns generated by the learning engine 50 have been used by the inference rule engine 60 in order to generate the classification rules. The operational phase consists in using the inference rule engine 60 to identify the type of application associated to encrypted traffic 200. The learning engine 50 is not used during the operational phase. The learning-base classification engine 70 is placed in a production environment, such as the IP data network of a Mobile Operator. A copy of the live IP traffic 10 is extracted from the network and directed to the DPI-based classification engine 30. The encrypted traffic 200 is part of the live IP traffic flow 10 and is processed by the DPI-based classification engine 30.

The DPI-based classification engine 30 operates in a standard way on the unencrypted part of the live IP traffic 10. Using the DPI technology, it identifies the type of application associated to the IP flows and generates an unencrypted traffic classification 250, which is transmitted to an exploitation system 80.

Different types of exploitation systems 80 are deployed in the Operator Network, to use the results of the traffic classification. Among others, qualify of service enforcement tools, security and threat detection tools, marketing analytic tools, are examples of such systems.

The DPI-based classification engine 30 extracts from the live IP traffic 10 the encrypted traffic 200 to be identified by the inference rule engine 60. Only the encrypted traffic corresponding to specific encryption protocols is extracted. The inference rule engine 60 has been certified to operate with these encryption protocols in a qualification process which will be further described later. All the IP packets belonging to such an encrypted IP flow are transmitted to the pre-processing unit 40.

The pre-processing unit 40 computes the same pre-defined set of parameters 210 as for the training phase. The computation is performed on the aforementioned encrypted IP packets transmitted to the pre-processing unit 40. A complete set of parameters is calculated for each IP flow. The parameters 210 are then transmitted to the inference rule engine 60.

As previously mentioned, an IP flow is usually defined by a tuple including the source IP address, the destination IP address, the transport protocol (TCP or UDP), the source port and the destination port. The present method and system only operates with encryption technologies which do not hide this notion of IP flow. For instance, it operates with TLS or SSL, since the encryption operates above the transport layer. But it does not operate with IPSec using the Encapsulation Security Payload (ESP), since the transport layer is encrypted. In a first approach, the method and system also do not operate with tunneled encryption, like a Virtual Private Network (VPN) using TSL (or SSL) or IPSec. In the case of a VPN, all the application sessions are tunneled in a single IP flow transported over the VPN and cannot be distinguished. However, in the case of a VPN client embedded on a mobile device, the method and system may still be effective with a reasonable recognition rate, since a mobile user usually operates a single application at a time. Thus, the associated IP flow transported in the VPN tunnel can be used to identify the application type.

Alternatively, proprietary encryption technologies operating above the transport layer, like for instance for Voice over IP (VoIP) applications, are also supported by the present method and system. For instance, Skype uses proprietary encryption to secure its communications. The Skype application has a characteristic network signature (characteristic patterns in Skype IP packets), making it possible to identify Skype IP flows using DPI technology. However, it is not possible to determine if a specific Skype IP flow is used for a voice communication, instant messaging or data transfer, since it is encrypted (it is not possible to extract identifying information from the encrypted Skype IP flow). Using the present method and system, it is possible to determine if a Skype IP flow corresponds to one among a voice communication, instant messaging or data transfer. The identification is based on the fact that the aforementioned parameters extracted from the Skype IP flows have different properties, based on the type of Skype IP flow (voice, instant messaging, or data transfer).

As mentioned for the training phase, the pre-processing unit 40 has the capability to identify and follow the IP traffic flow corresponding to a specific application session, to differentiate its uplink and downlink flows, and to calculate the parameters 210 representative of this application session. The aforementioned tuple is used to identify such an IP flow representing the application session.

Finally, the inference rule engine 60 processes the parameters 210 and identifies the associated type of application. The result, the encrypted traffic classification 220, is transmitted to the exploitation system 80. If the encrypted application is not part of the list of applications for which the learning engine 50 has been trained, it is characterized as unknown by the inference rule engine 60 (since it does not correspond to any learned application recognition pattern).

As mentioned earlier, a qualification and calibration phase is performed, before using the learning-based classification engine 70 in a production environment for the operational phase. The qualification phase consists in using a sample of encrypted IP traffic for which the application types are known in advance and to check that the inference rule engine 60 is capable of correctly identifying the application types of the sample.

The process is similar to the operational phase described in FIGS. 3 and 4, the only difference being that the encrypted traffic classification 220 is compared to the expected result and not used by an exploitation system 80. If the results of the qualification phase reach a pre-defined percentage of success, the learning-based classification engine 70 is qualified to be further used for the operational phase. If the results are below the expectations, the training is analyzed by an artificial intelligence expert in order to find a way to improve it. As already mentioned, this may be necessary in order to take into account the slight differences in the parameters 210, between the unencrypted traffic 100 of FIG. 1 and the encrypted traffic 200 of FIG. 3.

Additionally, the pre-processing unit 40 has the optional capability to automatically compensate the differences between the unencrypted traffic and the encrypted traffic for certain parameters 210. For example, considering the packet length, the additional overhead introduced by the encryption process is known for most encryption technologies. Thus the pre-processing unit can adjust the packet size of an encrypted packet, based on the encryption technology used, to accurately extrapolate the size of the packet if it was not encrypted. In this way, the size of the packet is similar to the one used during the training phase with unencrypted traffic. Another example is the property of most encryption protocols to include an initial negotiation phase, during which the precise type of encryption algorithm is negotiated, and the encryption keys are exchanged. This introduces an overhead that is taken into account by the pre-processing unit 40, by ignoring the packets corresponding to the negotiation phase, for each encryption protocol targeted by the solution. Generally speaking, the pre-processing unit calculations are customized for each supported encryption protocol, in order to take into account its specificities. Thus, it is possible to compensate as much as possible the overheads introduced by the encryption mechanisms, which affect the value of the parameters 210.

The sample of encrypted traffic used for the qualification phase consists in captured IP traffic 20, as described in FIG. 1. Each application type to be identified is present in the sample with a number of encrypted IP flows representing the associated applicative sessions. One way to proceed is to generate the sample by capturing encrypted live IP traffic 10 from the production environment. If it is not possible to generate encrypted IP traffic for which the associated application types are known in the production environment, it shall be performed in a controlled environment. The benefit of the controlled environment is that any type of encrypted traffic for any target application type is generated at will. The drawback of the controlled environment is that the temporal characteristics of the IP traffic may differ from the operational environment, which may affect the parameters 210 of FIG. 3. For instance, the packet latency is very dependent on the real time conditions of the operational environment. However, advanced traffic generators have the capability to simulate the real time conditions of operational environments, like for example the data network of a Mobile Network Operator. Such an advanced traffic generator is used to generate the qualification sample of encrypted traffic in a controlled environment.

The DPI-based classification engine has been introduced in FIG. 1 and FIG. 3, to perform the following tasks. First, identifying the types of applications present in an unencrypted traffic (classification 120 in FIG. 1). Secondly, extracting the IP flow parameters from both unencrypted and encrypted traffic (parameters 110 in FIGS. 1 and 210 in FIG. 3). A DPI-based classification engine is an appropriate solution for performing these two tasks, but any other solution capable of performing the two tasks is also appropriate.

Figure 5:
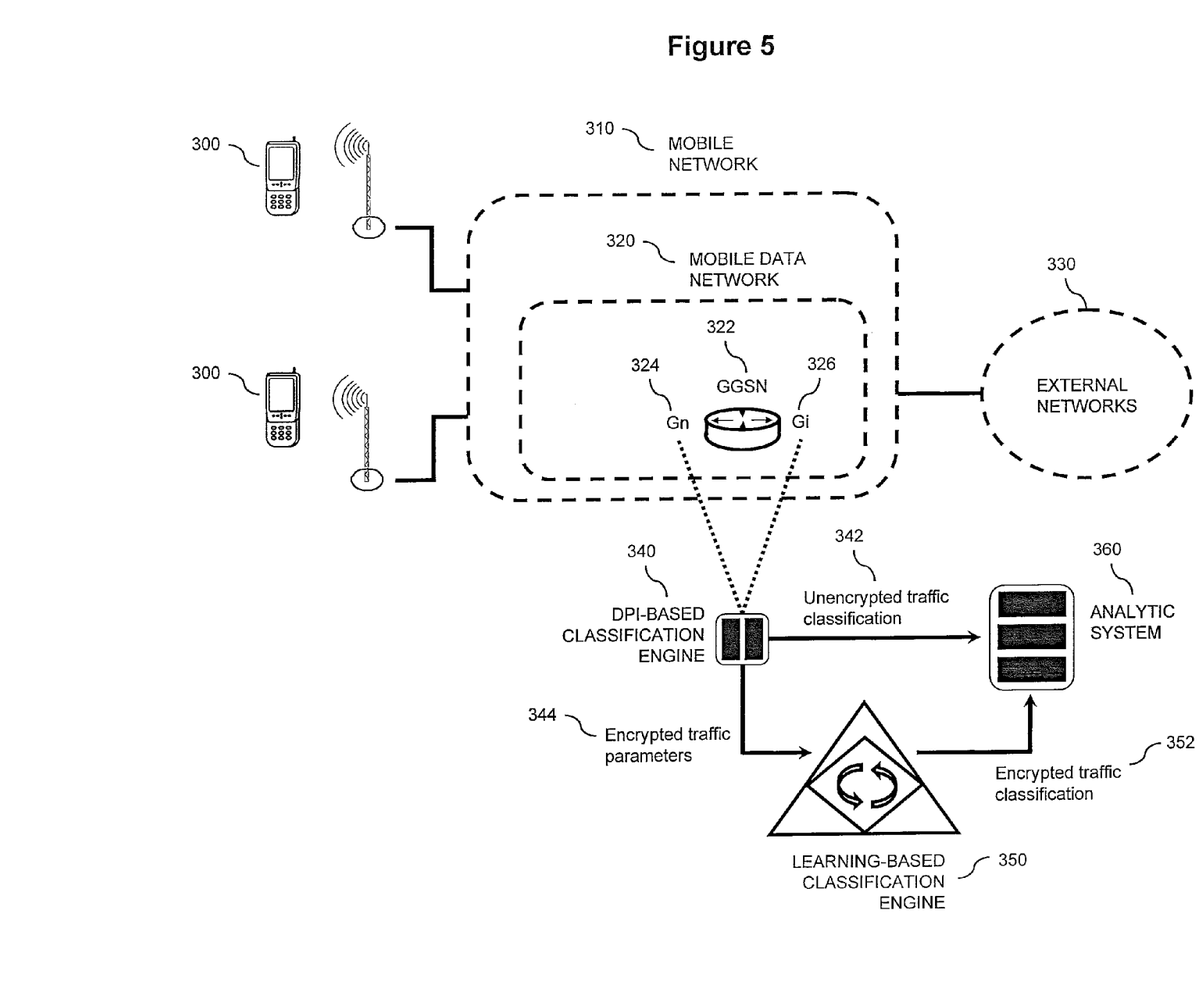
FIG. 5 is a schematic representation of the method and system of FIGS. 1, 2, 3 and 4 in the context of a mobile data network, according to a non-restrictive illustrative embodiment.

FIG. 5 illustrates the method and system of FIGS. 1, 2, 3 and 4 in the context of a mobile data network.

A mobile network 310 is considered in FIG. 5. Examples of such mobile networks include cellular networks implementing one of the following standards: Universal Mobile Telecommunication System (UMTS), Long Term Evolution (LTE), Code Division Multiple Access 2000 (CDMA 2000). Worldwide Interoperability for Microwave Access (WIMAX) networks are another type of mobile networks that are relevant to the present method and system.

The mobile network 310 comprises a mobile data network 320, to transport the data traffic generated by the data services provided by the Mobile Operator. Such data services consist, among others, in web browsing, messaging, multimedia delivery, on-line gaming, and business applications. The Internet Protocol (IP) is the underlying networking protocol used in mobile data networks, in the case of any type of cellular network as well as for WIMAX networks.

The mobile data network 320 is the interface between the mobile devices 300 engaged in a data session and the external networks 330. Any IP based data session in which a mobile device 300 is engaged, goes through the mobile data network 320. Different types of external networks are considered: the Internet, an ISP network, and also the services and applications network of the Operator like the IP Multimedia Subsystem (IMS).

More specifically, FIG. 5 represents a Universal Mobile Telecommunication System (UMTS) network, as an example of a mobile network. The Gateway GPRS Support Node (GGSN) 322 is the key equipment for the transport of the IP data traffic in the UMTS mobile data network 320. The GGSN 322 is connected through its Gi interface 326 to external networks 330. It is connected through its Gn interface 324 to the rest of the UMTS packet switched core network. The packet switched core network is the name of the mobile data network 320 for a UMTS network.

As represented in FIG. 5, a DPI-based classification engine 340 uses the Gn interface 324 or the Gi interface 326 as the point of capture for all the IP data traffic circulating in the mobile data network 320. The role of the DPI-based classification engine is to determine the type of application used for each IP flow and to transmit it to an analytic system 360. The analytic system is a Business Intelligence tool that generates reports used by the marketing teams of the Mobile Operator. Having an exhaustive real time view of which types of applications are used helps the Mobile Operator customize and improve mobile data services.

For the unencrypted data traffic, the DPI-based classification engine 340 operates in a standard mode. It uses its DPI functionality to identify the type of applications associated to the IP flows and transmits the results, the unencrypted traffic classification 342, to the analytic system 360.

For the encrypted data traffic, the DPI-based classification engine 340 operates as explained in the operational phase described in FIGS. 3 and 4. The DPI-based classification engine 340 extracts the encrypted traffic parameters 344 (e.g. packet size, latency, packet number) from the extracted IP flows. These parameters are transmitted to the learning-based classification engine 350. Using these parameters, the learning-based classification engine 350 identifies the associated type of application and transmits the result, the encrypted traffic classification 352, to the analytic system 360. For simplification purpose, in FIG. 5, the two sub-components of the learning-based classification engine 350 (learning engine and inference rule engine) are not represented.

Before the operational phase, the learning-based classification engine 350 is trained as explained in the training phase described in FIGS. 1 and 2. The training is performed for a set of target encryption methods and for a set of target application types, to be supported. The learning-based classification engine 350 also goes through a qualification phase, as mentioned earlier.

Although the present method and system has been described in the foregoing specification by means of several non-restrictive illustrative embodiments, these illustrative embodiments can be modified at will within the scope, spirit and nature of the appended claims.

What is claimed is:

1. A method for identifying an application type from encrypted traffic transported over an IP network, the method comprising:
    extracting at least a portion of IP packet related parameters from IP packets of an encrypted IP flow of the encrypted traffic;
    transmitting the extracted IP packet related parameters to a learning-based classification engine, the learning-based classification engine having been trained with unencrypted traffic; and
    inferring by the learning-based classification engine at least one corresponding application type for the encrypted IP flow based on the extracted IP packet related parameters;
    wherein:
    the IP packet related parameters have corresponding values in both an IP flow of the training unencrypted traffic corresponding to the application type and the encrypted IP flow of the encrypted traffic, wherein training the learning-based classification engine with unencrypted traffic consists in performing a mapping between values of IP packet related parameters of unencrypted IP flows and corresponding application types of the unencrypted IP flows; and
    inferring by the learning-based classification engine is performed by comparing values of the extracted IP packet related parameters with the corresponding values for the training unencrypted traffic.

2. The method of claim 1, wherein the IP packet related parameters comprise at least one among the following: IP packets length in the IP flow, IP packets latency in the IP flow, and number of IP packets in the IP flow.

3. The method of claim 1, wherein the values of the IP packet related parameters are computed for at least one among the following: uplink IP flow packets and downlink IP flow packets.

4. The method of claim 1, wherein for each of the extracted IP packet related parameters at least one of the following value is computed: minimum value of the parameter, maximum value of the parameter, average value of the parameter, and standard deviation of the parameter.

5. The method of claim 1, wherein the learning-based classification engine is based on artificial intelligence technology among the following: artificial neural networks, hidden Markov models, and clustering algorithms including K-Nearest Neighbor and K-Mean.

6. The method of claim 1, wherein the application type comprises at least one of the following: bulk applications including FTP (File Transfer Protocol), interactive applications including SSH (Secure Shell) and Telnet, web applications based on HTTP (HyperText Transfer Protocol), peer-to-peer applications, mail applications, multimedia applications including audio and video streaming, VoIP applications including Skype.

7. The method of claim 1, wherein the IP packets of the encrypted IP flow are identified via common IP packets characteristics consisting of at least one of the following: a source IP address, a destination IP address, a transport protocol, a source port number and a destination port number.

8. The method of claim 1, wherein the traffic comprises at least one of the following: mobile IP traffic, fixed IP traffic, or corporate IP traffic.

9. A system for identifying an application type from encrypted traffic transported over an IP network, the system comprising:

a computer implemented pre-processing unit for:

identifying IP packets of an encrypted IP flows of the encrypted traffic;

extracting at least a portion of IP packet related parameters from the identified IP packets of the encrypted IP flow; and a computer implemented learning-based classification engine trained with unencrypted traffic, the learning-based classification engine inferring an at least one corresponding application type for the encrypted IP flows based on the extracted IP packet related parameters;

wherein:

the IP packet related parameters have corresponding values in both an IP flow of the training unencrypted traffic corresponding to the application type and the encrypted IP flow of the encrypted traffic; and the learning-based classification engine infers the corresponding application type by comparing values of the extracted IP packet related parameters with corresponding values for the training unencrypted traffic;

wherein:

the learning-based classification engine comprises a learning engine and an inference rule engine; and a mapping between values of IP packet related parameters of unencrypted IP flows and the corresponding application types of the unencrypted IP flows is performed by the learning engine, and the inference of an application type corresponding to values of IP packet related parameters of an encrypted IP flows is performed by the inference rule engine.

10. The system of claim 9, wherein the pre-processing unit automatically compensates for slight distortions introduced by an encryption type in the value of the IP packet related parameters of the encrypted IP flow.

11. The system of claim 9, wherein the IP packet related parameters comprise at least one among the following: IP packets length in the IP flow, IP packets latency in the IP flow, and number of IP packets in the IP flow.

12. The system of claim 9, wherein the learning-based classification engine is based on artificial intelligence technology among the following: artificial neural networks, hidden Markov models, and clustering algorithms including K-Nearest Neighbor and K-Mean.

13. The system of claim 9, wherein the application type comprises at least one of the following: bulk applications including FTP (File Transfer Protocol), interactive applications including SSH (Secure Shell) and Telnet, web applications based on HTTP (HyperText Transfer Protocol), peer-to-peer applications, mail applications, multimedia applications including audio and video streaming, VoIP applications including Skype.

14. The system of claim 9, wherein the IP packets of the encrypted IP flow are identified via common IP packets characteristics consisting of at least one of the following: a source IP address, a destination IP address, a transport protocol, a source port number and a destination port number.

15. The system of claim 9, wherein the traffic comprises at least one of the following: mobile IP traffic, fixed IP traffic, or corporate IP traffic.

16. The system of claim 9, wherein the values of the IP packet related parameters are computed for at least one among the following: uplink IP flow packets and downlink IP flow packets.

17. The system of claim 9, wherein for each of the extracted IP packet related parameters at least one of the following value is computed: minimum value of the parameter, maximum value of the parameter, average value of the parameter, and standard deviation of the parameter.

* * * * *